United States Patent
Sundman et al.

(10) Patent No.: US 12,294,966 B2
(45) Date of Patent: May 6, 2025

(54) METHODS, APPARATUS AND DEVICE-READABLE MEDIUMS FOR DETECTING CHANGES IN DISTANCE BETWEEN WIRELESS DEVICES

(71) Applicant: Telefonaktiebolaget LM Ericsson (publ), Stockholm (SE)

(72) Inventors: Dennis Sundman, Sollentuna (SE); Satyam Dwivedi, Solna (SE); Miguel Lopez, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 241 days.

(21) Appl. No.: 17/430,806

(22) PCT Filed: Feb. 21, 2019

(86) PCT No.: PCT/EP2019/054386
§ 371 (c)(1),
(2) Date: Aug. 13, 2021

(87) PCT Pub. No.: WO2020/169202
PCT Pub. Date: Aug. 27, 2020

(65) Prior Publication Data
US 2022/0167293 A1 May 26, 2022

(51) Int. Cl.
*H04W 4/02* (2018.01)
*G01S 13/76* (2006.01)
(Continued)

(52) U.S. Cl.
CPC ......... *H04W 56/005* (2013.01); *G01S 13/765* (2013.01); *G01S 19/51* (2013.01); *H04W 4/023* (2013.01); *H04W 56/006* (2013.01)

(58) Field of Classification Search
None
See application file for complete search history.

(56) References Cited

U.S. PATENT DOCUMENTS 10,104,510 B2   10/2018  Lee et al.
10,539,662 B2 *  1/2020  Takizawa ................. G02B 7/32
(Continued)

FOREIGN PATENT DOCUMENTS

DE   102015017146 A1   3/2017
JP      2006020274 A   1/2006
(Continued)

OTHER PUBLICATIONS

"IEEE P802.11-REVmcTM/D8.0, Aug. 2016", Draft Standard for Information technology—Telecommunications and information exchange between systems, Local and metropolitan area networks—Specific requirements; Part 11: Wireless LAN Medium Access Control (MAC) and Physical Layer (PHY) Specifications, Aug. 2016, pp. 1-3774.
(Continued)

*Primary Examiner* — Willie J Daniel, Jr.
(74) *Attorney, Agent, or Firm* — Weisberg I.P. Law, P.A.

(57) ABSTRACT

In one aspect, a method for detecting changes in distance between a first wireless device and a second wireless device is provided. The method comprises determining a variation of a parameter over time, based on measurements of first timing signals transmitted between the first and second wireless devices. The variation of the parameter depends on a distance between the wireless devices, and comprises periodic step transitions as a result of relative clock drift between the wireless devices. The method further comprises predicting a time at which a periodic step transition is expected to occur based on the variation of the parameter, and determining a value of the parameter based on measurements of second timing signals. In response to a determination that the determined value of the parameter differs from an expected value of the parameter, it is determined that the distance between the wireless devices has changed.

23 Claims, 8 Drawing Sheets

(51) Int. Cl.
    *G01S 19/51*           (2010.01)
    *H04W 56/00*        (2009.01)

(56) References Cited

U.S. PATENT DOCUMENTS

| | | |
|---|---|---|
| 2007/0287386 A1 | 12/2007 | Agrawal et al. |
| 2014/0213193 A1 | 7/2014 | Zhang et al. |
| 2016/0277196 A1 | 9/2016 | Jose et al. |
| 2016/0277888 A1 | 9/2016 | Niesen et al. |

FOREIGN PATENT DOCUMENTS

| | | |
|---|---|---|
| JP | 2009533990 A | 9/2009 |
| JP | 2016507193 A | 3/2016 |
| JP | 2018514752 A | 6/2018 |

OTHER PUBLICATIONS

"IEEE Std 802.11™—2016", Part 11: Wireless LAN Medium Access Control (MAC) and Physical Layer (PHY) Specifications, IEEE Standard for Information technology—Telecommunications and information exchange between systems Local and metropolitan area networks—Specific requirements, Dec. 14, 2016, pp. 1-3534.

\* cited by examiner (a)

(b)

METHODS, APPARATUS AND DEVICE-READABLE MEDIUMS FOR DETECTING CHANGES IN DISTANCE BETWEEN WIRELESS DEVICES

TECHNICAL FIELD

Embodiments of the present disclosure relate to wireless devices, and particularly to methods, apparatus and device-readable mediums for detecting changes in distance between wireless devices.

BACKGROUND

In IEEE 802.11, time-of-flight measurements are used to determine distances between wireless devices as part of the fine timing measurement (FTM) protocol, which was introduced in IEEE 802.11mc. According to the FTM protocol, time-of-flight measurements on signals sent between multiple wireless devices and a target device may be used to estimate the position of the target device using triangulation.

An FTM procedure can be initiated by any wireless device that supports the FTM protocol as an initiator. To initiate the FTM procedure, a first wireless device (referred to as the initiating device) transmits an initial FTM Request frame. The frame is received at a second wireless device that supports the FTM protocol as a responder (referred to as the responding device). The responding device responds to the initial FTM Request frame with an acknowledgment. On receipt of the acknowledgment, the initiating device initiates one or more FTM bursts with the responding device.

The FTM protocol introduces an additional frame, the FTM frame. An FTM burst begins with the responding device transmitting an FTM frame to the initiating device. The responding device then waits for an acknowledgment from the initiating device before transmitting a subsequent FTM frame. This procedure may be repeated one or more times as part of an FTM burst. The responding device records the transmission timestamps of the FTM frames and the reception timestamps of the corresponding acknowledgments. Similarly, the initiating device records the reception timestamps of the FTM messages and the transmission timestamps of the corresponding acknowledgments. The transmissions and reception timestamps of the FTM messages and the corresponding acknowledgments are then used to determine a round trip time for the messages, from which a distance between the devices can be determined. If the initiating device is to calculate the distance between it and the responding device, the FTM frames transmitted by the responding device may comprise indications of the transmission timestamps of the FTM frames, and the reception timestamps of the corresponding acknowledgments.

An estimate of a distance between two wireless devices may thus be obtained by using a single FTM burst comprising four messages. However, precision of distance measurements obtained via the FTM protocol is limited by the sampling interval of the wireless devices. For example, in a 20 MHz channel sampled at the nominal rate, the distance between two wireless devices can only be determined to within ±7.5 m.

Thus, the FTM protocol may be insensitive to small changes in distance between two wireless devices. In order to measure the distance more accurately, multiple FTM exchanges may be used and an average of the results calculated. However, this takes time and consumes energy in the wireless devices.

SUMMARY

Embodiments of the present disclosure seek to address these and other problems.

In one aspect, the present disclosure provides a method of detecting changes in distance between a first wireless device and a second wireless device. The method comprises determining a variation of a parameter over time, based on measurements of first timing signals transmitted between the first wireless device and the second wireless device. The variation of the parameter depends on a distance between the first wireless device and the second wireless device, and comprises periodic step transitions as a result of relative clock drift between the first wireless device and the second wireless device. The method further comprises, based on the determined variation of the parameter, predicting a time at which a periodic step transition is expected to occur, and determining a value of the parameter based on measurements of second timing signals. The second timing signals are subsequently transmitted between the first wireless device and the second wireless device close to the predicted time. In response to a determination that the determined value of the parameter differs from an expected value of the parameter, the method further comprises determining that the distance between the first wireless device and the second wireless device has changed.

Apparatus and device-readable mediums are also provided for performing the method set out above. For example, in one aspect there is provided a node for detecting changes in distance between a first wireless device and a second wireless device. The node comprises processing circuitry and a device-readable medium storing instructions which, when executed by the processing circuitry, cause the node to determine a variation of a parameter over time, based on measurements of first timing signals transmitted between the first wireless device and the second wireless device, wherein the variation of the parameter depends on a distance between the first wireless device and the second wireless device, and comprises periodic step transitions as a result of relative clock drift between the first wireless device and the second wireless device. The node is further caused to, based on the determined variation of the parameter, predict a time at which a periodic step transition is expected to occur, and determine a value of the parameter based on measurements of second timing signals. The second timing signals are subsequently transmitted between the first wireless device and the second wireless device close to the predicted time. In response to a determination that the determined value of the parameter differs from an expected value of the parameter, the node is further caused to determine that the distance between the first wireless device and the second wireless device has changed.

In another aspect there is provided a device-readable medium for detecting changes in distance between a first wireless device and a second wireless device. The device-readable medium stores instructions which, when executed by processing circuitry of a node, cause the node to determine a variation of a parameter over time, based on measurements of first timing signals transmitted between the first wireless device and the second wireless device, wherein the variation of the parameter depends on a distance between the first wireless device and the second wireless device, and comprises periodic step transitions as a result of relative clock drift between the first wireless device and the second wireless device. The node is further caused to, based on the determined variation of the parameter, predict a time at which a periodic step transition is expected to occur, and determine a value of the parameter based on measurements of second timing signals. The second timing signals are subsequently transmitted between the first wireless device and the second wireless device close to the predicted time.

In response to a determination that the determined value of the parameter differs from an expected value of the parameter, the node is further caused to determine that the distance between the first wireless device and the second wireless device has changed.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
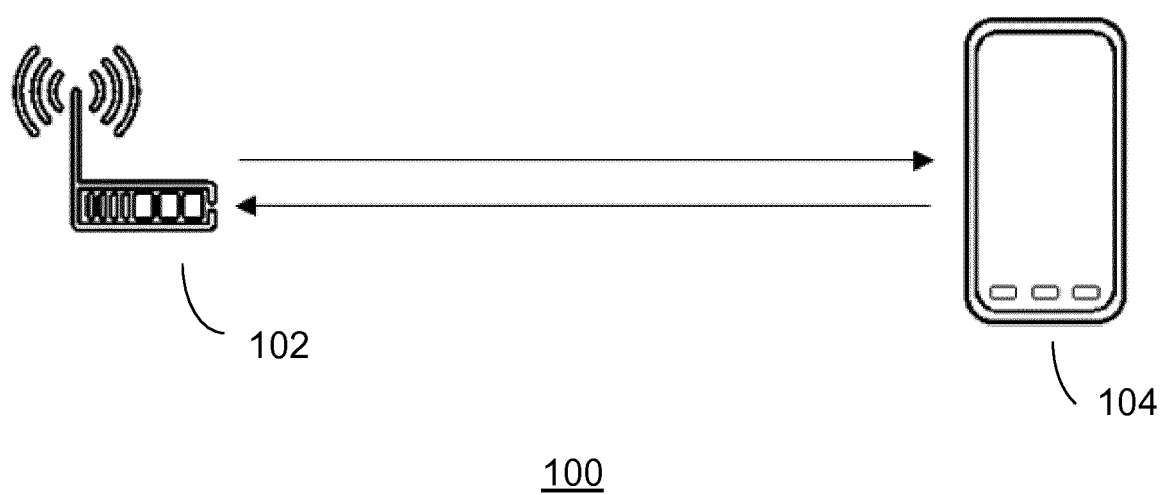
FIG. 1 shows a wireless communication network according to embodiments of the disclosure.

FIG. 1 shows a wireless communication network 100 according to embodiments of the disclosure. The network 100 comprises a wireless access point 102 in communication with a mobile station 104. In one embodiment, the network 100 implements the IEEE 802.11 standard (known as "Wi-Fi") and may implement one or more of its amendments, and comprises a wireless local area network (WLAN). For convenience, the terminology used herein may correspond to that used in the 802.11 standard (e.g., "access point", "station"). However, the concepts described herein may also find use in other radio-access technologies. For example, the network 100 may implement cellular radio-access technologies, such as those developed by the 3$^{rd}$ Generation Partnership Project (3GPP), e.g., Wideband Code-Division Multiple-Access (WCDMA), Long Term Evolution (LTE), New Radio (NR), etc. In such cases, the wireless access point 102 may be called a base station, NodeB, eNodeB, gNodeB, transmission-reception point (TRP), etc. The mobile station 104 may be called a user equipment (UE), a wireless device, a wireless terminal device, etc. The term "node" is used herein to mean any wireless device and any suitable network node.

Although FIG. 1 shows a single wireless access point 102 and a mobile station 104, those skilled in the art will appreciate that the network 100 may comprise any number of wireless access points and mobile stations. In particular, as noted above, multiple wireless access points 102 may be used to perform multiple FTM procedures with the mobile station 104 in order to triangulate its position.

Figure 2:
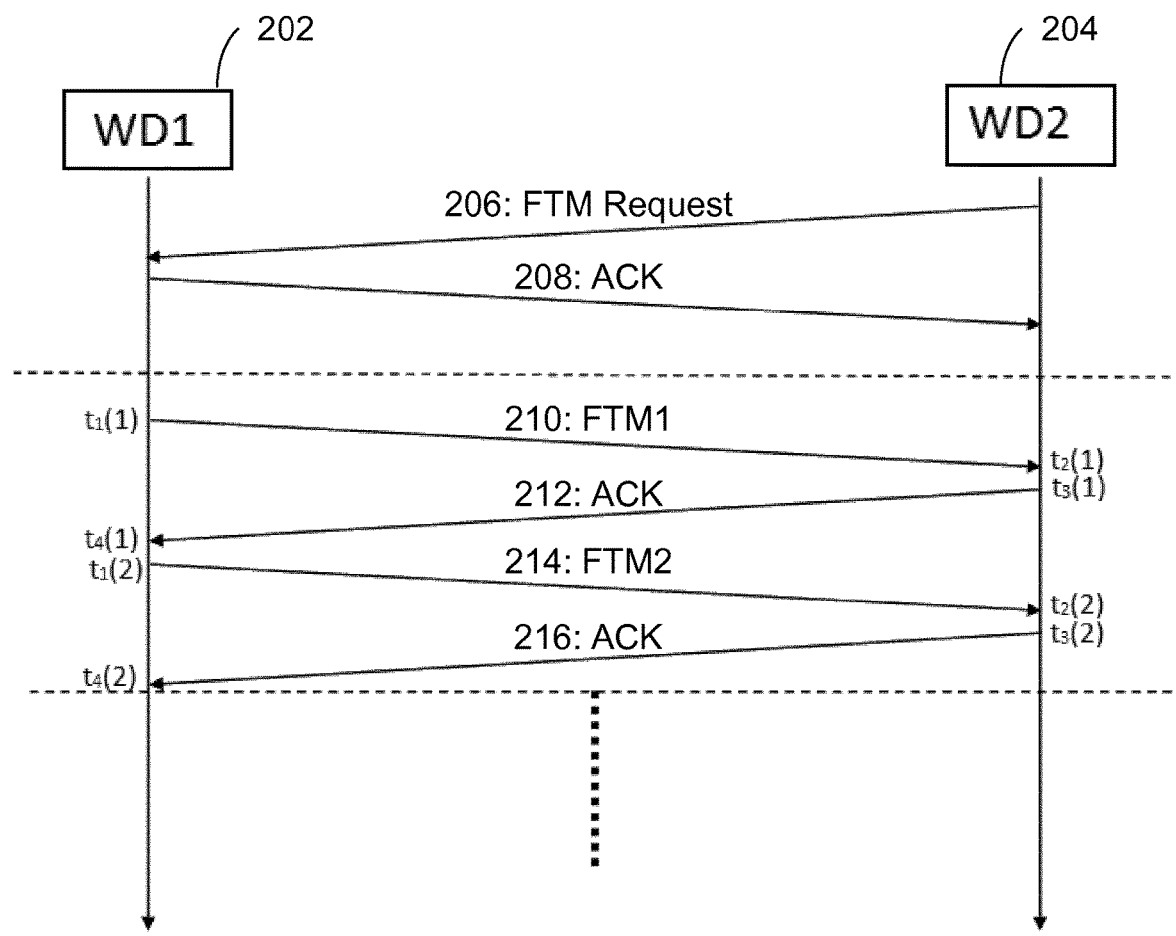
FIG. 2 is a signaling diagram for a fine timing measurement procedure.

FIG. 2 shows a signaling diagram of messages exchanged between a first wireless device 202 and a second wireless device 204 in accordance with a fine timing measurement (FTM) protocol. The first wireless device may be, for example, one of the wireless access point 102 and the mobile station 104 described in respect of FIG. 1. The second wireless device may be, for example, the other of wireless access point 102 and the mobile station 104 described in respect of FIG. 1.

The procedure begins with the second wireless device 204 transmitting an FTM Request frame 206 to the first wireless device 202. The FTM Request frame may include an indication of one or more parameters relating to the FTM procedure. The one or more parameters may include, for example, one or more of the following: a burst timeout parameter which is indicative of the duration of each FTM burst, a burst period which is indicative of the time interval from the beginning of one FTM burst to the beginning of a subsequent FTM burst, a number of FTM messages to be exchanged as part of each FTM burst, and a number of FTM bursts to be performed.

On receipt of the FTM Request frame 206, the first wireless device 202 transmits an acknowledgment 208 to the second wireless device 204. The first wireless device 202 thus acts as a responding device and the second wireless device 204 acts as an initiating device.

At time $t_1(1)$ the first wireless device 202 transmits a first FTM message 210 as part of an FTM burst. The first FTM message 210 is received at the second wireless device 204 at time $t_2(1)$. In response to receiving the first FTM message 210, the second wireless device 204 transmits an acknowledgment at time $t_3(1)$ to the first wireless device 202. The acknowledgment is received at the first wireless device 202 at time $t_4(1)$. Thus the first FTM message 210 and the acknowledgment 212 form a first FTM exchange as part of the FTM burst.

At time $t_1(2)$, the first wireless device 202 transmits a second FTM message 214 to the second wireless device 204 as part of a second FTM exchange. The second FTM message 214 may comprise measurements of the time at which the first FTM message 210 was transmitted by the first wireless device 202 and the time at which the corresponding acknowledgment 212 was received at the first wireless device 202 (i.e. times $t_1(1)$ and $t_4(1)$). In response to receiving the second FTM message 214 at time $t_2(2)$, the second wireless device 204 transmits an acknowledgment 216 to the first wireless device 202 at time $t_3(2)$. The first wireless device 202 receives the acknowledgment at time $t_4(2)$.

As described above, the times at which particular messages are received and transmitted are recorded at each wireless device 202, 204. However, the clocks at the first wireless device 202 and the second wireless device may be offset from one another such that a time recorded at the first wireless device 202 $t^{WD1}$ is offset from the corresponding time at the second wireless device 204 $t^{WD2}$ by some factor, $\Delta$. Therefore, $$t^{WD1} = t^{WD2} + \Delta.$$

The time-of-flight of each signal transmitted between the first and second wireless devices 202, 204, $t^{ToF}$, is related to the timestamps of the respective signals via $$t_2 - t_1 = t^{ToF} - \Delta$$

$$t_4 - t_3 = t^{ToF} + \Delta$$

where the relative clock offset may be expressed as $$\Delta = \frac{(t_4 - t_3) - (t_2 - t_1)}{2}.$$

Assuming the relative clock offset remains constant, the distance between the first wireless device and the second wireless device may thus be estimated from $$\text{distance}(WD1, WD2) = \frac{(t_2 - t_1) + (t_4 - t_3)}{2} c,$$

where c is the speed of light.

Those skilled in the art will appreciate that the distance between the first and second wireless devices 202, 204 may be calculated by any device which has knowledge of the values of $t_4$, $t_3$, $t_2$, and $t_1$. In the illustrated embodiment, the distance may be calculated by the second wireless device 204 (initiating device), as it receives an indication of the values of $t_4$ and $t_1$ (e.g., in the second FTM frame 214). In alternative embodiments, however, the distance may be calculated by the first wireless device 202, if it is sent the values of $t_3$ and $t_2$, or even a third device (e.g., a network node) if it is sent the values of $t_4$, $t_3$, $t_2$, and $t_1$ by the first and second wireless devices 202, 204.

As noted above, timing measurements are imprecise owing to the sampling frequency of each clock, and therefore distance estimates may be obtained by averaging over a large number of FTM exchanges. In the signaling diagram shown in FIG. 2, only a single FTM burst is shown, although those skilled in the art will appreciate that more FTM bursts may be used to determine a distance measurement. Further, the FTM burst shown in FIG. 2 comprises two FTM exchanges, but it will be appreciated that each FTM burst may contain more FTM exchanges than those shown. For an FTM procedure comprising n FTM exchanges, the distance between two wireless devices may be obtained from $$\text{distance}(WD1, WD2) = \frac{c}{2n} \sum_{k=1}^{n} [t_2(k) - t_1(k)] + [t_4(k) - t_3(k)].$$

This averaging procedure assumes that the clocks at the first and second wireless device are running at the same rate so that the relative clock offset Δ does not change over time. However, in practice clocks may drift relative to one another, meaning that the relative clock offset Δ changes over time.

Figure 3:
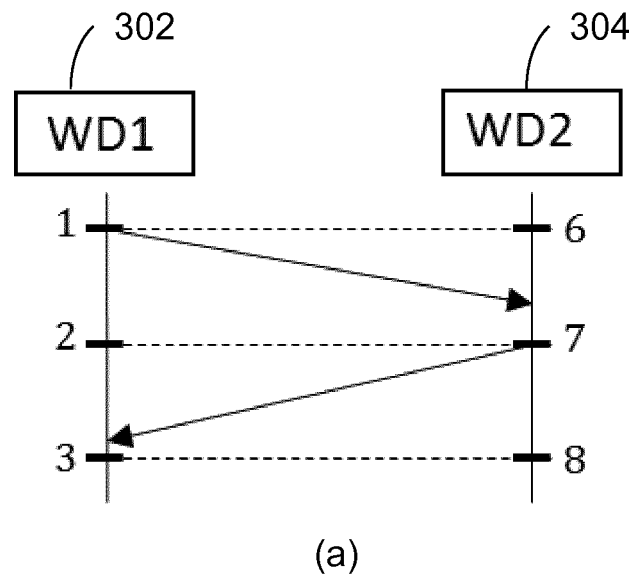
FIG. 3 shows signaling diagrams for simplified fine timing measurement exchanges.
Figure 3:
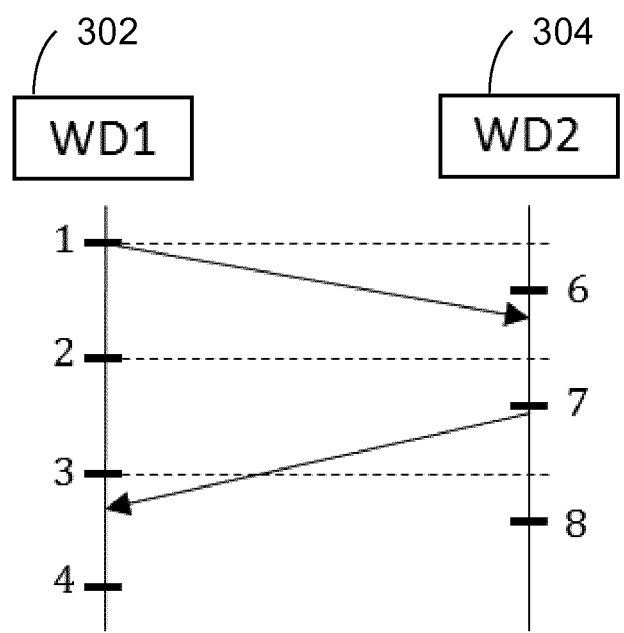

The impact of clock drift on FTM distance measurements may be demonstrated by reference to FIG. 3. In (a), FIG. 3 shows a first simplified FTM exchange between a first wireless device 302 and a second wireless device 304. The vertical axes show the times according to the local clocks within each wireless device. It will be noted in this example that the local clocks are not synchronized to the same values (i.e., there is an offset, as described above).

The exchange comprises a first message (such as an FTM message) transmitted by the first wireless device 302 at time 1. The first message is received at the second wireless device 304 at a time between time 6 and time 7. However, due to the limited sampling rate of the second wireless device 304, the second wireless device 304 records the time at which the first message is received as time 7. The second wireless device 304 then transmits an acknowledgment to the first wireless device at time 7. The acknowledgment is received at the first wireless device 302 shortly before time 3, but is recorded as being received at time 3. This first FTM exchange thus gives a time-of-flight estimate of $$\frac{(t_2 - t_1) + (t_4 - t_3)}{2} = \frac{(7-1) + (3-7)}{2} = 1.$$

In (b), FIG. 3 shows a second simplified FTM exchange between the first wireless device 302 and the second wireless device 304, where the clock at the second wireless device 304 has drifted relative to the clock at the first wireless device 302. In the second exchange, the first wireless device 302 transmits a second message to the second wireless device 304 at time 1 that is received at the second wireless device 304 shortly after time 6. Due to the limited sampling rate of the second wireless device 304, the time at which the message is received at the second wireless device 304 is recorded as 7. The second wireless device 304 responds with an acknowledgment message at time 7, which is received at the first wireless device 302 shortly after time 3 and is recorded as being received at the first wireless device 302 at time 4. This second FTM exchange thus gives a time-of-flight estimate of $$\frac{(t_2 - t_1) + (t_4 - t_3)}{2} = \frac{(7-1) + (4-7)}{2} = 1.5.$$

It will be noted that the actual time of flight in examples (a) and (b) is approximately 0.75. Thus both measured values are greater than the actual time of flight. This is due to the fact that timing measurements are consistently performed at a clock transition after the relevant event (e.g., transmission or reception of a signal). Thus the measured values will consistently introduce some additional time. If averaged over multiple measurements, this additional time will be equal to half a clock period.

It will be apparent to the skilled person that the distance measured between the first wireless device 302 and the second wireless device 304 varies periodically as a square wave when there is a relative clock drift between the wireless devices 302, 304. Those skilled in the art will appreciate that the term square wave may be taken to include, for example, a rectangular wave.

Figure 4:
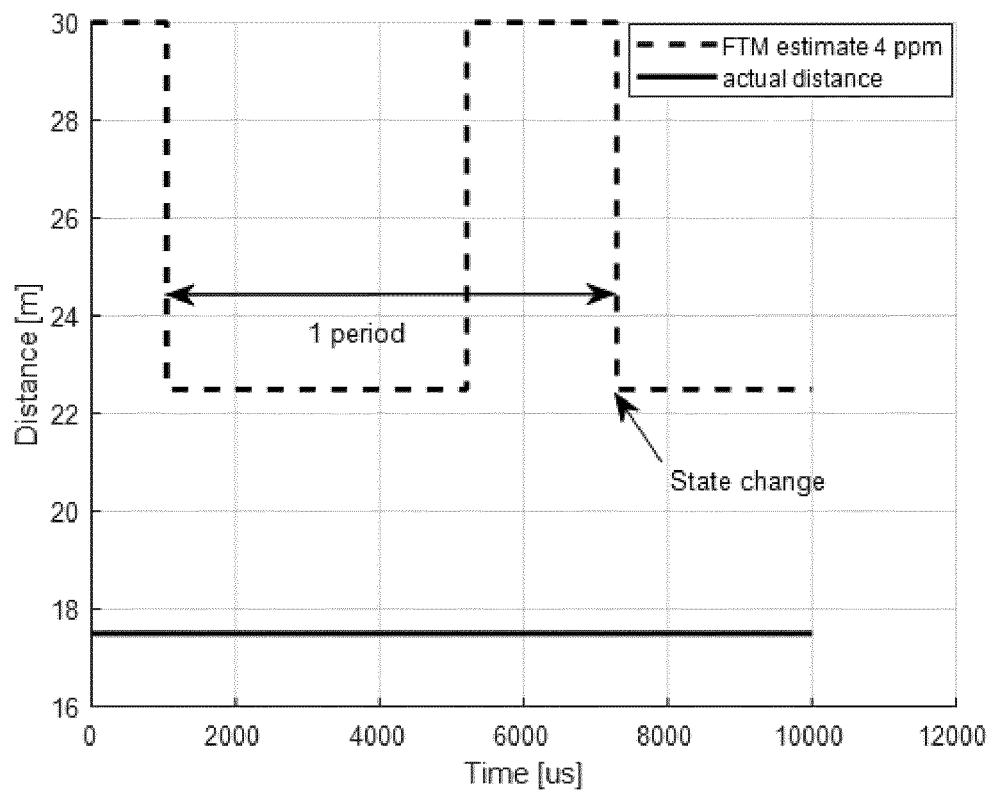
FIG. 4 is an illustration showing the variation in measured distance between a first and second wireless device over time.

This is illustrated in FIG. 4, which shows a variation in a distance measured between a first wireless device and a second wireless device as a function of time. The distances are measured based on timing signals transmitted between the first and second wireless devices. In the particular example, the signals are transmitted over a 20 MHz channel, which is sampled at the nominal rate. The clocks at the wireless devices each have a 4 parts-per-million (ppm) accuracy, leading to an 8 ppm relative clock drift between the two wireless devices. As illustrated, the actual distance between the two wireless devices is constant at 17.5 m. However, the measured distance varies as a square wave that varies between a first value (22.5 m) and a second value (30 m), with periodic step changes occurring when the wave transitions from the first value to the second value. The periodic step changes occur as a consequence of the relative clock drift between the wireless devices. The period of the square wave is sensitive to both the sampling time, $T_S$, and the relative clock drift δ, and is given by $$t_p = \frac{T_S}{\delta} = \frac{5 \times 10^{-8} s}{8 \times 10^{-6}} = 6.250 \text{ ms}.$$

As described above, existing methods for detecting changes in distance between two wireless devices determine an average value from a large number of FTM exchanges to obtain a single distance measurement. To detect a change in distance between two wireless devices, this procedure must be repeated at least twice, to determine an initial distance estimate (before the distance has changed) and a second distance estimate (after the distance has changed). Therefore, existing methods for detecting changes in distance using time-of-flight measurements require a large number of FTM exchanges. Further, due to the limited precision of distance estimates (arising from the limited sampling rate), existing methods may be insensitive to small changes in distance.

Embodiments of the disclosure address these and other problems. One aspect provides a method that comprises determining a variation in a parameter over time, in which the variation of the parameter depends on a distance between the first wireless device and the second wireless device. The variation of the parameter comprises periodic step transitions. By determining whether a measured value of the parameter at a time close to a predicted periodic step transition differs from an expected value of that parameter at that time, it may be determined whether the distance between the first wireless device and the second wireless device has changed. Embodiments of the disclosure therefore enable the detection of changes in distances between wireless devices whilst reducing overhead signaling. In addition, embodiments of the disclosure allow for the detection of smaller changes in distance between wireless devices that may be otherwise difficult or impossible to detect using the existing FTM procedure.

As noted above, the distance measured between two wireless devices using FTM measurements when there is a relative clock drift between the wireless devices varies as a square wave. Embodiments of the disclosure utilize the properties of the variation of the measured distance with time to detect changes in distance between two wireless devices. This is described in more detail with reference to FIG. 5.

Figure 5:
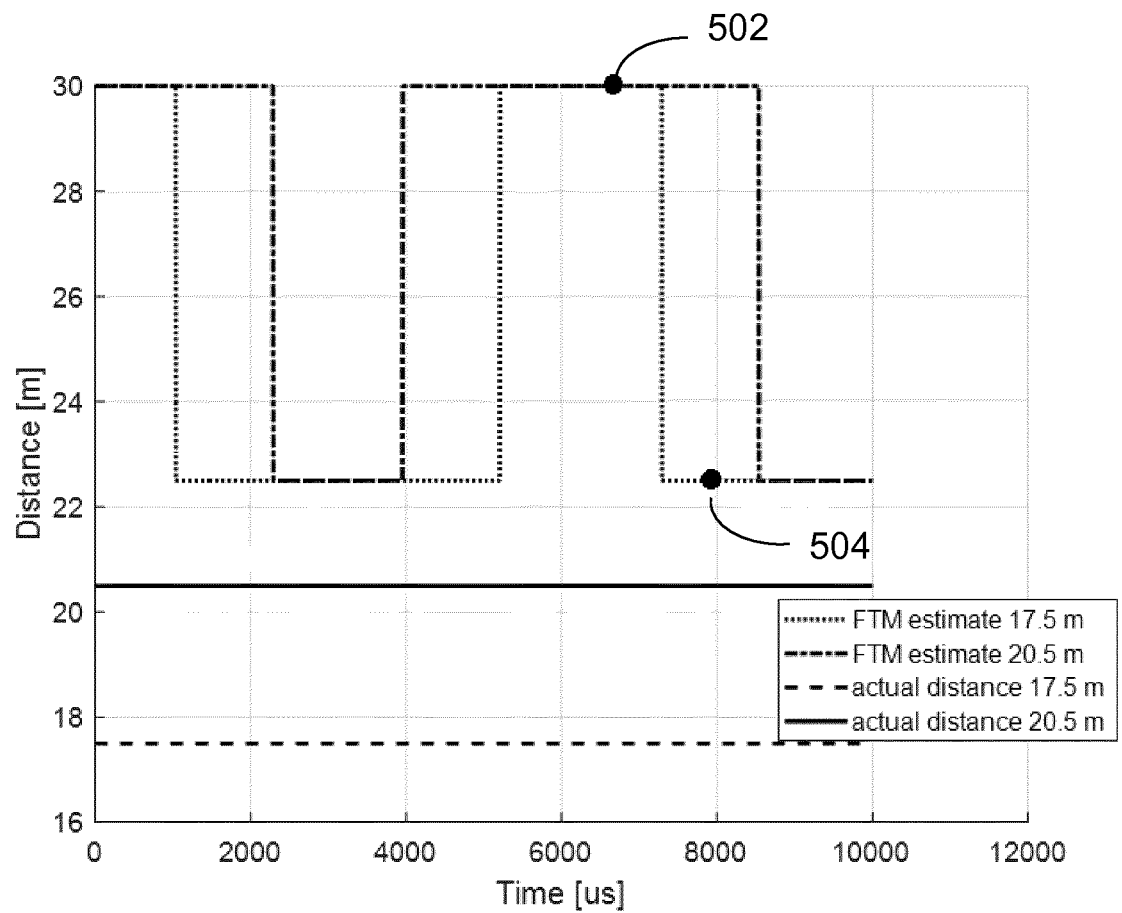
FIG. 5 is a further illustration showing the variation in measured distance between a first and second wireless device over time.

FIG. 5 illustrates how a variation in time of a measured distance between two wireless devices changes as the actual distance between the two devices changes. The dotted line shows the variation of the measured distance between the two wireless devices when the distance between the two devices is 17.5 m (as in FIG. 4). As the distance between the wireless devices increases to 20.5 m (illustrated by the dot-dashed line), the peaks in the square wave broaden such that the time at which transitions occurs changes by $$\pm \frac{t_p}{2T_S c} D,$$

where D is the change in distance, $t_p$ is the period of the square wave, $T_s$ is the sampling time and c is the speed of light. Thus the durations of the minima and maxima of the square wave function are sensitive to changes in distance between the wireless devices.

Embodiments of the disclosure use this property to detect changes in distance between a first wireless device and a second wireless device. In one aspect, the variation of the measured distance between the first and second wireless device over time is determined. Thus, in the embodiment illustrated in FIG. 5, a number of measurements of the distance between the first and second wireless devices are performed in order to determine the variation of the measured distance with time (illustrated by the dotted line).

Based on the determined variation of the measured distance over time, a time at which a periodic step transition is expected to occur is predicted. For example, in the embodiment illustrated in FIG. 5, the periodic step transition at 7.292 μs may be predicted based on the occurrence of a periodic step transition at 1.042 μs and the period of the square wave (6.250 μs).

The measured distance between the first and second wireless devices is then determined at a time close to the predicted transition (e.g. at a time close to 7.292 μs) and compared with an expected value of the measured distance to determine whether the distance between the wireless devices has changed.

In the illustrated example, the square wave is evaluated at times which are offset from a predicted transition by $$\frac{t_p}{2T_S c} D = \frac{6250}{30} 3 = 625 \ \mu s$$

on both sides of the predicted transition (i.e. at points 502 and 504). By selecting D=3 in this example, it is possible to detect changes in distance of at least 3 m. Based on the variation of the measured distance, it is thus determined that the measured distance will have an expected value of 30 m at point 502 before the predicted step transition and an expected value of 22.5 m at point 504 after the predicted step transition. As illustrated in the figure, the measured distance is instead determined to have a value of 30 m at point 504, which differs from the expected value of 22.5 m. Thus, it is determined that the distance has increased by at least 3 m. If the state had changed at point 502 instead, it would be determined that the distance between the first and second wireless device had decreased by at least 3 m.

Although the foregoing description has been with regards to a variation in the measured distance between the first and second wireless device, those skilled in the art will appreciate that the same methods may be applied to other parameters for which the variation over time is dependent on the distance between the first and second wireless device.

Figure 6:
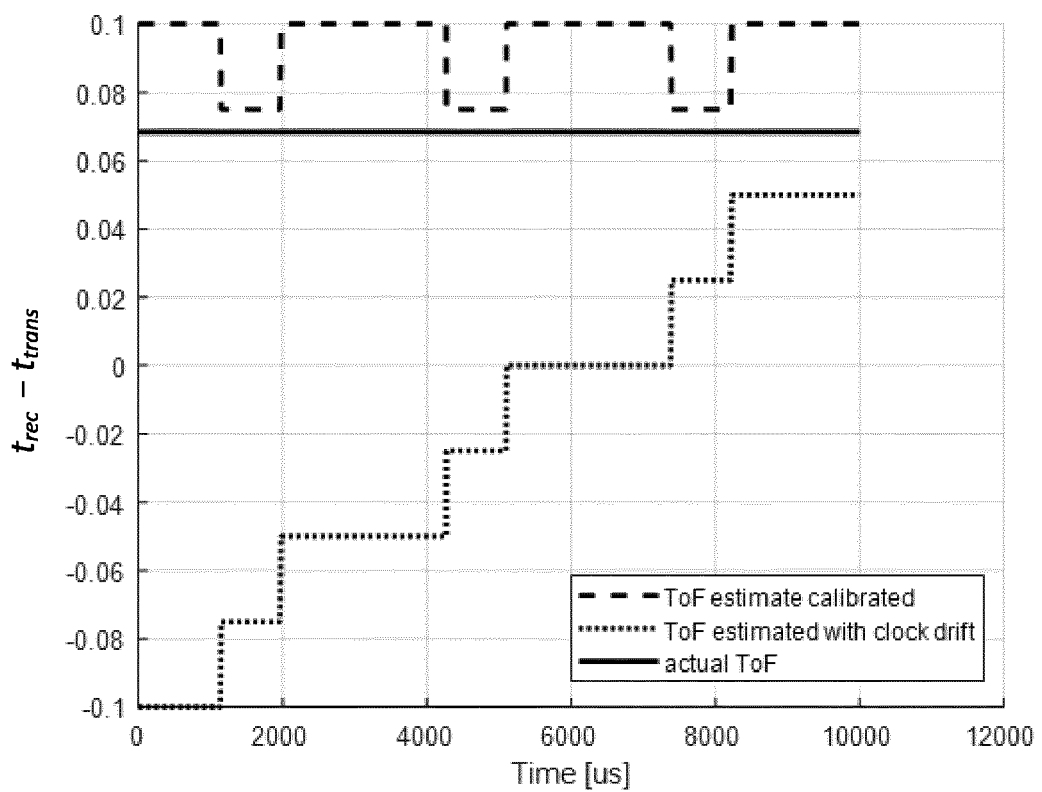
FIG. 6 is an illustration showing the variation of a clock difference value for signals transmitted between a first wireless device and a second wireless device over time.

Accordingly, further embodiments of the disclosure are concerned with a variation in a clock difference value, $t_{rec}-t_{trans}$, over time. The clock difference value is a difference between a time at which a signal is recorded as being transmitted at a first wireless device $t_{trans}$ and the time at which the signal is recorded as being received at a second wireless device $t_{rec}$, as illustrated in FIG. 6. It will be noted that the clock difference value will vary as the time-of-flight varies (e.g., as the distance between the first and second wireless devices changes); however, the clock offset between the first and second wireless devices is not known, and thus the time-of-flight itself cannot be resolved from the single measurement. The solid black line in FIG. 6 shows the actual time-of-flight for signals transmitted between the first wireless device and the second wireless device.

The dotted line shows the variation in measurements of the clock difference value, $t_{rec}-t_{trans}$, for signals transmitted between the first wireless device and the second wireless device when there is a relative clock drift between clocks at the first wireless device and a clock at the second wireless device. Although the distance between the first wireless device and the second device does not change, the clock difference value $t_{rec}-t_{trans}$ varies as an increasing step function, with periodic step transitions occurring as a result of relative clock drift between the first wireless device and the second wireless device. The time between step transitions in the step function also depends on the distance between the first and second wireless devices.

It will be apparent that the clock difference value may instead vary as a decreasing step function, e.g., where the relative clock drift between the wireless devices is negative.

To aid understanding, the dashed line in FIG. 6 shows the variation in drift-compensated measurements of $t_{rec}-t_{trans}$ for signals transmitted between the first wireless device and the second wireless device, i.e., in which the measurements of the clock difference value $t_{rec}-t_{trans}$ have been adjusted to account for the relative clock drift (and hence clock offset) between the first and second wireless devices. It can be seen that the drift-compensated clock difference value varies as a square function, in a similar manner to the measured distance described above. As with the square wave described above with respect to FIG. 5, the time at which each periodic step transition occurs is sensitive to the distance between the first and second wireless device. Thus, the same approach outlined above in respect of FIG. 5 may also be applied to FIG. 6, substituting the measured distance in FIG. 5 for the clock difference value.

Figure 7:
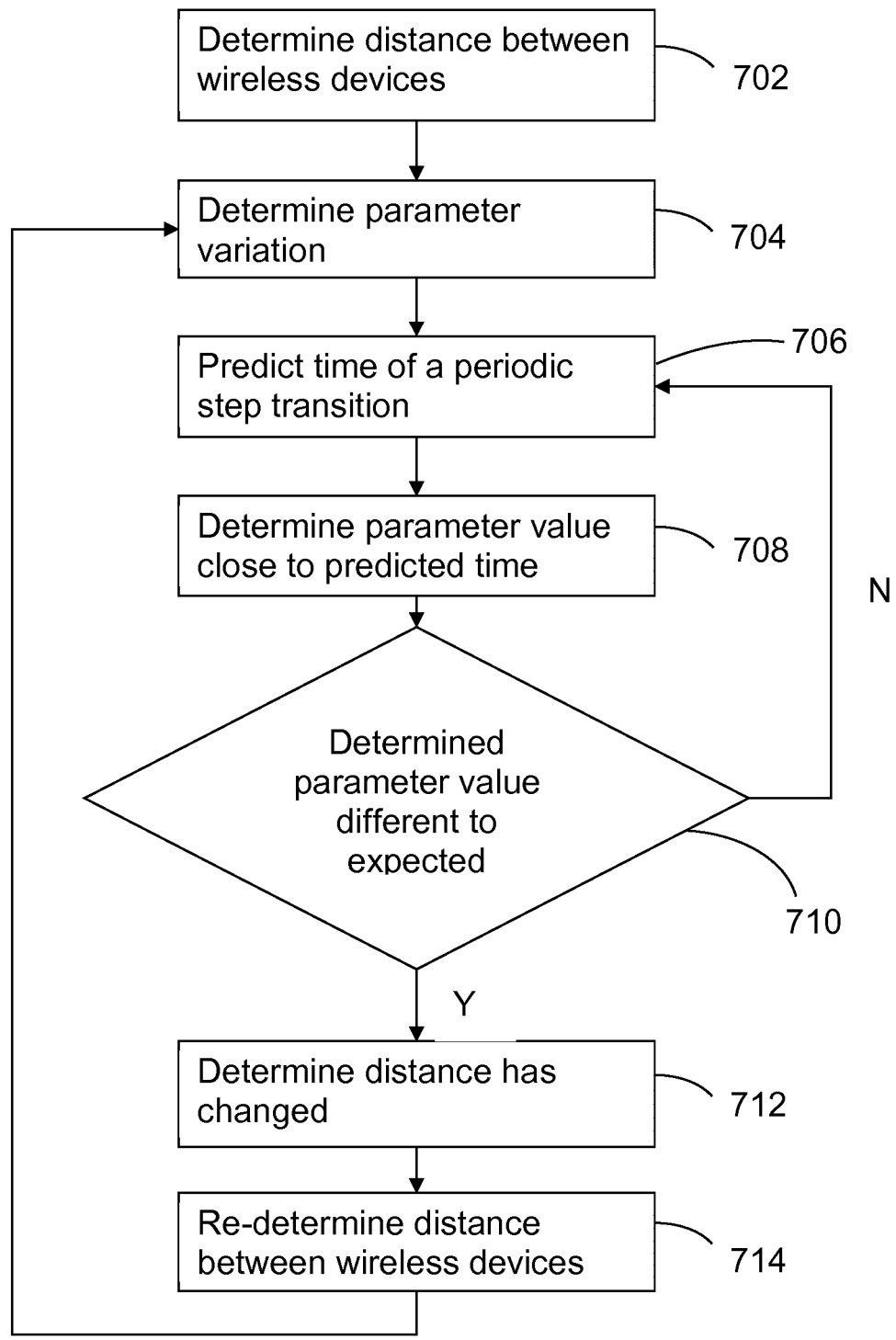
FIG. 7 is a flowchart of a method according to embodiments of the disclosure.

FIG. 7 is a flowchart of a method of detecting changes in distance between a first wireless device and a second wireless device according to embodiments of the disclosure. The method may, for example, be performed in the first wireless device or the second wireless device. In an alternative example, the first and second wireless devices may form part of a wireless communication network, and the method may be performed by a network node in the wireless communication network which is separate from the first and second wireless devices.

The method begins in step 702, in which an initial distance between the first and second wireless device is determined. Those skilled in the art will appreciate that there are many suitable methods for determining the distance between wireless devices.

In one embodiment, the initial distance is a time-averaged distance measurement. The time-averaged distance measurement may be determined based on a plurality of timing signals. The timing signals may be FTM signals, and may comprise one or multiple FTM bursts. For example, the initial distance may be determined using the FTM procedure described above with reference to FIG. 2, averaging the measured distance over multiple FTM signals or FTM bursts.

In alternative embodiments, the initial distance between the wireless devices may be determined based on positioning data for the wireless devices. For example, the initial distance between the wireless devices may be determined based on positioning data obtained from a satellite navigation system such as GPS, GLONASS, etc.

The method then proceeds to step 704, in which a variation in a parameter over time is determined based on measurements of first timing signals transmitted between the first wireless device and the second wireless device. The first timing signals may be, for example, FTM signals. The first timing signals may thus be transmitted as part of an FTM procedure. The first timing signals may, for example, consist of a single FTM burst.

The parameter may be a measured distance between the first and second wireless device. In this respect, the measured distance is based on a single FTM exchange (i.e. two FTM frames and corresponding acknowledgments), and/or is not averaged over multiple measurements. Thus the variation of the measured distance may be a square wave, as described above in respect of FIG. 5. As noted above, the term square wave may be taken to refer to a square wave or a rectangular wave (i.e. the durations of the minima in the square wave may be equal to or different from the durations of the maxima in the square wave).

In an alternative example, the parameter may be a clock difference value between the first and second wireless devices. Thus, in one example, the parameter is the difference between the time at which a signal is recorded as being transmitted from one of the wireless devices, $t_{trans}$, and the time at which a signal is recorded as being received at the other of the wireless devices, $t_{rec}$.

The variation of the parameter depends on a distance between the first wireless device and the second wireless device, and comprises periodic step transitions as a result of relative clock drift between the first wireless device and the second wireless device. The variation of the parameter may further be dependent on a sampling frequency of the timing signal measurements. The periodic step transitions may thus further be a result of the limited resolution of the parameter (e.g., the quantization of the parameter owing to the finite sampling frequency of the timing signal measurements).

Once the variation of the parameter has been determined, the method proceeds to step 706, which comprises predicting a time at which a periodic step transition in the variation of the parameter is expected to occur based on the determined variation in the parameter. The predicted time may be determined based on a model or function fitted to the determined variation in the parameter. The predicted time may be determined based on one or more characteristics of the determined variation in the parameter. For example, a predicted time at which a periodic step transition is expected to occur may be determined based on a frequency (or, equivalently, a period) of the variation in the parameter. In another example, a predicted time may be determined based on a duty cycle of the variation in the parameter. Thus, where the variation is a square wave, the predicted time may be determined based on a predicted duration of time spent at an upper value of the parameter and/or a predicted duration of time spent at a lower value of the parameter.

The method then proceeds to step 708, in which a value of the parameter at a time close to the predicted time of the periodic step change is determined. The value of the parameter is determined based on measurements of second timing signals transmitted between the first and second wireless devices at the time close to the predicted time, i.e., subsequent to the first timing signals. The second timing signals may be FTM signals. The second timing signals may, for example, consist of a single FTM burst, or a single FTM exchange.

The value of the parameter may be determined at a predetermined interval from the predicted time.

In particular embodiments, the value of the parameter may be determined at an interval of $$\pm \frac{t_p}{2T_S c} D$$

from the predicted time, in which $t_p$ is the period of the variation in the parameter, $T_S$ is a sampling time, c is the speed of light and D is a minimum detectable change in distance.

The value of the parameter may be determined at more than one time close to the predicted time of the periodic step change. In an embodiment, a first value of the parameter is determined based on measurements made before the predicted time of the periodic step change and a second value of the parameter is determined based on measurements made after the predicted time of the periodic step change. Thus, the parameter may be determined before and after the predicted time of the periodic step change.

The interval may be selected based on an expected level of noise in the parameter. Noise in this context may be taken to include, for example, channel noise and/or clock noise. Those skilled in the art will appreciate that noise may affect the time at which a periodic step transition in the parameter occurs. Therefore, the interval may be chosen to be sufficiently large to reduce the risk of erroneously detecting a change in the distance between the first and second wireless devices based on noise. For example, the value of the minimum detectable change in distance D may be selected such that the measurements are performed sufficiently far from the predicted step transition.

The method then proceeds to step 710, in which the parameter value determined in step 708 is compared to an expected value of the parameter. The expected value of the parameter may be determined based on the variation in the parameter over time, in a similar manner to the predicted time of the step transition. The expected value of the parameter may be determined based on a model or function fitted to the determined variation in the parameter. The expected value of the parameter may be determined based on one or more characteristics of the determined variation in the parameter.

If the determined parameter value does not differ from the expected parameter value (i.e. they are the same, or they are the same within some confidence interval), then it can be determined that the distance between the first and second wireless devices has not changed, or has not changed more than the detectable distance D. In the illustrated embodiment, the method returns to step 706, in which a time of a further periodic step transition is predicted. The method may thus continue to predict periodic step changes and compare values of the parameter close to the predicted periodic step transition with expected values in order to detect changes in distance between the first wireless device and the second wireless device.

Alternatively, if the determined value of the parameter differs from the expected parameter value, the method proceeds to step 712, in which it is determined that the distance between the first wireless device and the second wireless device has changed, or has changed by at least the detectable distance D. Thus, in the embodiment described above in relation to FIG. 5 in which two wireless devices are initially at a separation of 17.5 m, the expected values of the measured distance at points 502 and 504 would be 30 m and 22.5 m respectively. By comparing these expected values of the measured distance with the determined values of 30 m and 30 m respectively, it is determined that the distance between the first and second wireless device has changed. Further, by comparing the expected values of the measured distance with determined values of the measured distance based on measurements made before and after the predicted time, it may be determined whether the distance between the wireless devices has increased or decreased.

The method may then optionally proceed to step 714 in which the distance between the first and second wireless devices is re-determined in response to the determination that the distance between the first and second wireless device has changed. This step may be substantially similar to step 702 described above. Thus, the distance may be a time-averaged distance. The time-averaged distance measurement may be determined based on a plurality of timing signals. The timing signals may be FTM signals, and may comprise one or multiple FTM bursts. For example, the distance may be determined using the FTM procedure described above with reference to FIG. 2, averaging the measured distance over multiple FTM signals or FTM bursts. In alternative embodiments, the initial distance between the wireless devices may be determined based on positioning data for the wireless devices. For example, the initial distance between the wireless devices may be determined based on positioning data obtained from a satellite navigation system such as GPS, GLONASS, etc.

The measurements performed in steps 702 and 714 may require a greater amount of signaling than the measurement performed in step 708. For example, the measured distances in steps 702 and 714 may be based on an average of multiple timing measurements, e.g., multiple FTM exchanges and/or multiple FTM bursts. In contrast, the measured distance in step 708 may be based on a single FTM exchange or a single FTM burst. Embodiments of the disclosure thus reduce overhead signaling by only obtaining more accurate measurements of a distance between wireless devices once a change in distance between the wireless devices has been detected.

Thus FIG. 7 sets out a method that allows for detecting changes in distance between wireless devices.

Figure 8:
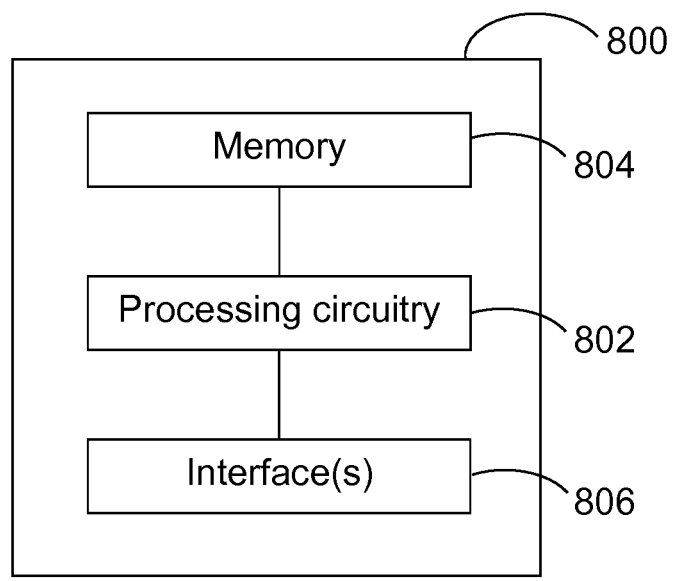
FIGS. 8 and 9 are schematic diagrams of a node according to embodiments of the disclosure.

FIG. 8 is a schematic diagram of a node or processing device 800 for detecting changes in distance between a first wireless device and a second wireless device according to embodiments of the disclosure. The node or processing device 800 may be configured to carry out the method described above with respect to FIG. 7, for example. The node or processing device 800 may be, for example, the first wireless device or the second wireless device. Alternatively, one or more of the first wireless device and the second wireless device may form part of a wireless communications network, and the node or processing device 800 may be a node in the wireless communications network.

The node or processing device 800 comprises processing circuitry 802 and a device-readable medium (such as memory) 804. The device-readable medium 804 stores instructions which, when executed by the processing circuitry 802, cause the node or processing device 800 to: determine a variation of a parameter over time, based on measurements of first timing signals transmitted between the first wireless device and the second wireless device. The variation of the parameter depends on a distance between the first wireless device and the second wireless device, and comprises periodic step transitions as a result of relative clock drift between the first wireless device and the second wireless device. The node or processing device 800 is further caused to, based on the determined variation of the parameter, predict a time at which a periodic step transition is expected to occur, and determine a value of the parameter based on measurements of second timing signals. The second timing signals are subsequently transmitted between the first wireless device and the second wireless device close to the predicted time. In response to a determination that the determined value of the parameter differs from an expected value of the parameter, the node or processing device 800 is further caused to determine that the distance between the first wireless device and the second wireless device has changed.

In the illustrated embodiment, the node 800 also comprises one or more interfaces 806, for receiving signals from other nodes and/or transmitting signals to other nodes. The interfaces 806 may use any appropriate communication technology, such as electronic signaling, optical signaling or wireless (radio) signaling.

Although FIG. 8 shows the processing circuitry 802, the memory 804 and the interface(s) 806 coupled together in series, those skilled in the art will appreciate that the components of the node or processing device 800 may be coupled together in any suitable manner (e.g. via a bus or other internal connection).

Figure 9:
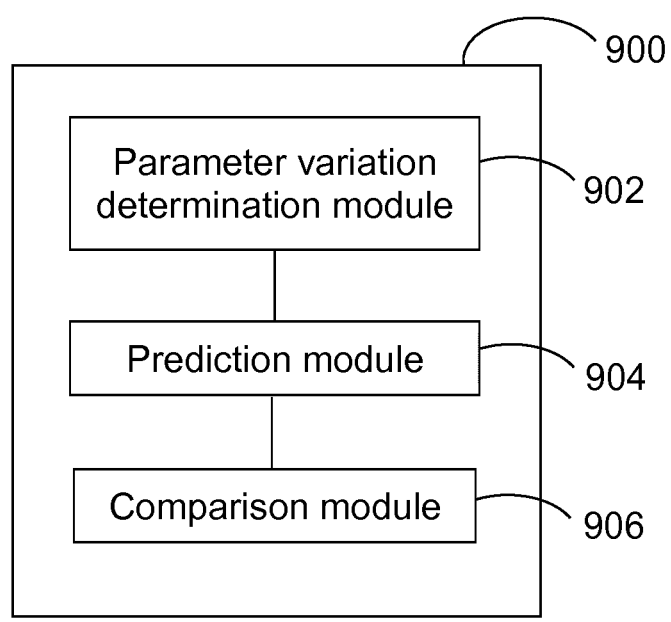

FIG. 9 is a schematic illustration of a node or processing device 900 for detecting changes in distance between a first wireless device and a second wireless device according to further embodiments of the disclosure. The node or processing device 900 may be configured to perform the method of FIG. 7, for example. The node or processing device 900 may be, for example, the first wireless device or the second wireless device. Alternatively, one or more of the first wireless device and the second wireless device may form part of a wireless communications network, and the node or processing device 900 may be a node in the wireless communications network.

The node or processing device 900 comprises a parameter variation determination module 902. The parameter variation determination module 902 is configured to: determine a variation of a parameter over time, based on measurements of first timing signals transmitted between the first wireless device and the second wireless device. The variation of the parameter depends on a distance between the first wireless device and the second wireless device, and comprises periodic step transitions as a result of relative clock drift between the first wireless device and the second wireless device.

As illustrated, the node or processing device 900 further comprises a prediction module 904, which is configured to predict a time at which a periodic step transition is expected to occur based on the determined variation of the parameter.

The node or processing device 900 further comprises a comparison module 906. The comparison module 906 is configured to determine a value of the parameter based on measurements of second timing signals, wherein the second timing signals are subsequently transmitted between the first wireless device and the second wireless device close to the predicted time. In response to a determination that the determined value of the parameter differs from an expected value of the parameter, the comparison module 906 is further configured to determine that the distance between the first wireless device and the second wireless device has changed.

The node or processing device 900 may also comprise one or more interface modules (not illustrated), for receiving signals from other nodes of the network and/or transmitting signals to other nodes of the network. The interfaces may use any appropriate communication technology, such as electronic signaling, optical signaling or wireless (radio) signaling.

The modules described above with respect to FIG. 9 may comprise any combination of hardware and/or software. For example, in an embodiment, the modules are implemented entirely in hardware. As noted above, hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. In another embodiment, the modules may be implemented entirely in software. In yet further embodiments, the modules may be implemented in combinations of hardware and software.

The present disclosure therefore provides methods, apparatus and device-readable mediums for detecting changes in distance between wireless devices. Specifically, the occurrence of periodic step transitions in a variation of a parameter over time is used to compare an expected value of the parameter with a determined value of the parameter close to a predicted periodic step transition in order to determine whether a distance between a first and second wireless device has changed.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfill the functions of several units recited in the statements. Any reference signs in the claims shall not be construed so as to limit their scope.

The invention claimed is:

1. A method of detecting changes in a distance between a first wireless device and a second wireless device, the method comprising:
   determining a variation of a parameter over time, based on measurements of first timing signals transmitted between the first wireless device and the second wireless device, the variation of the parameter depending on the distance between the first wireless device and the second wireless device, and the variation of the parameter including periodic step transitions that are a result of relative clock drift between the first wireless device and the second wireless device;
   based on the variation of the parameter, predicting a time at which one of the periodic step transitions is expected to occur;
   determining a value of the parameter based on measurements of second timing signals transmitted between the first wireless device and the second wireless device, the second timing signals being transmitted subsequent to the first timing signals and close to the predicted time; and
   responsive to determining that the determined value of the parameter differs from an expected value of the parameter, determining that the distance between the first wireless device and the second wireless device has changed.

2. The method according to claim 1, further comprising determining the expected value of the parameter based on the variation of the parameter over time.

3. The method according to claim 1, wherein determining the value of the parameter based on measurements of second timing signals comprises:
   determining a first value of the parameter based on measurements made prior to the predicted time; and
   determining a second value of the parameter based on measurements made after the predicted time.

4. The method according to claim 3, wherein determining that the determined value of the parameter differs from the expected value of the parameter comprises determining one or more of the following:
   the first value of the parameter differs from a first expected value of the parameter; and
   the second value of the parameter differs from a second expected value of the parameter.

5. The method according to claim 1, further comprising:
prior to determining the variation of the parameter over time, determining a first time-averaged distance between the first wireless device and the second wireless device; and
responsive to determining that the distance between the first wireless device and the second wireless device has changed, determining a second time-averaged distance between the first and second wireless devices based on measurements of third timing signals transmitted between the first wireless device and the second wireless device.

6. The method according to claim 1, wherein:
a resolution of the parameter is limited by a sampling frequency of the timing signal measurements; and
the periodic step transitions are also a result of the limited resolution of the parameter.

7. The method according to claim 1, wherein:
the parameter is a measured distance between the first wireless device and the second wireless device; and
the variation of the measured distance is a square wave.

8. The method according to claim 7, wherein:
the square wave varies between first and second values, and
the expected value of the parameter at the predicted time comprises one of the first and second values.

9. The method according to claim 1, wherein the parameter is a measured clock difference value between the first wireless device and the second wireless device.

10. The method according to claim 9, wherein the measured clock difference value varies according to a step function.

11. The method according to claim 1, wherein the first timing signals and the second timing signals are fine time measurement (FTM) signals.

12. A wireless device configured to detect changes in a distance between the wireless device and a further wireless device, the wireless device being one of a first wireless device and a second wireless device, the further wireless device being the other of the first wireless device and the second wireless device, the wireless device comprising:
processing circuitry and a device-readable medium storing executable instructions that, when executed by the processing circuitry, cause the wireless device to:
determine a variation of a parameter over time, based on measurements of first timing signals transmitted between the first wireless device and the second wireless device, the variation of the parameter depending on the distance between the first wireless device and the second wireless device, and the variation of the parameter including periodic step transitions that are a result of relative clock drift between the first wireless device and the second wireless device;
based on the variation of the parameter, predict a time at which one of the periodic step transitions is expected to occur;
determine a value of the parameter based on measurements of second timing signals transmitted between the first wireless device and the second wireless device, the second timing signals being transmitted subsequent to the first timing signals and close to the predicted time; and
responsive to determining that the determined value of the parameter differs from an expected value of the parameter, determine that the distance between the first wireless device and the second wireless device has changed.

13. The wireless device according to claim 12, wherein execution of the instructions further causes the wireless device to determine the expected value of the parameter based on the variation in the parameter over time.

14. The wireless device according to claim 12, wherein execution of the instructions causes the wireless device to determine the value of the parameter based on measurements of second timing signals based on:
determining a first value of the parameter based on measurements made prior to the predicted time; and
determining a second value of the parameter based on measurements made after the predicted time.

15. The wireless device according to claim 14, wherein execution of the instructions causes the wireless device to determine that the determined value of the parameter differs from the expected value of the parameter based on determining one or more of the following:
the first value of the parameter differs from a first expected value of the parameter; and
the second value of the parameter differs from a second expected value of the parameter.

16. The wireless device according to claim 12, wherein execution of the instructions further causes the wireless device to:
prior to determining the variation of the parameter over time, determine a first time-averaged distance between the first wireless device and the second wireless device; and
responsive to determining that the distance between the first wireless device and the second wireless device has changed, determine a second time-averaged distance between the first and second wireless devices based on measurements of third timing signals transmitted between the first wireless device and the second wireless device.

17. The wireless device according to claim 12, wherein:
a resolution of the parameter is limited by a sampling frequency of the timing signal measurements; and
the periodic step transitions are also a result of the limited resolution of the parameter.

18. The wireless device according to claim 12, wherein:
the parameter is a measured distance between the first wireless device and the second wireless device; and
the variation of the measured distance is a square wave.

19. The wireless device according to claim 18, wherein:
the square wave varies between first and second values, and
the expected value of the parameter at the predicted time comprises one of the first and second values.

20. The wireless device according to claim 12, wherein the parameter is a measured clock difference value between the first wireless device and the second wireless device.

21. The wireless device according to claim 20, wherein the measured clock difference value varies according to a step function.

22. The wireless device according to claim 12, wherein the first timing signals and the second timing signals are fine time measurement (FTM) signals.

23. A non-transitory, device-readable medium storing computer-executable instructions that, when executed by processing circuitry of a wireless device configured to detect changes in a distance between the wireless device and a further wireless device, the wireless device being one of the first wireless device and the second wireless device, and the further wireless device being the other of the first wireless device and the second wireless device, configure the wireless device to:

- determine a variation of a parameter over time, based on measurements of first timing signals transmitted between the first wireless device and the second wireless device, wherein: the variation of the parameter depends depending on the distance between the first wireless device and the second wireless device, and the variation of the parameter includes including periodic step transitions that are a result of relative clock drift between the first wireless device and the second wireless device;
- based on the determined variation of the parameter, predict a time at which one of the periodic step transitions is expected to occur;
- determine a value of the parameter based on measurements of second timing signals transmitted between the first wireless device and the second wireless device, wherein the second timing signals being transmitted subsequent to the first timing signals and close to the predicted time; and
- responsive to determining that the determined value of the parameter differs from an expected value of the parameter, determine that the distance between the first wireless device and the second wireless device has changed.

* * * * *